Jan. 1, 1957 F. T. ANDREWS, JR 2,776,380

ELECTRICAL CIRCUITS EMPLOYING MAGNETIC CORES

Filed April 27, 1954 4 Sheets-Sheet 1

INVENTOR
F. T. ANDREWS, JR.
BY
ATTORNEY

Jan. 1, 1957 F. T. ANDREWS, JR 2,776,380

ELECTRICAL CIRCUITS EMPLOYING MAGNETIC CORES

Filed April 27, 1954 4 Sheets-Sheet 2

INVENTOR
F. T. ANDREWS, JR.
BY James W. Falk
ATTORNEY

INVENTOR
F. T. ANDREWS, JR.
BY James W. Falk
ATTORNEY

Jan. 1, 1957 F. T. ANDREWS, JR 2,776,380

ELECTRICAL CIRCUITS EMPLOYING MAGNETIC CORES

Filed April 27, 1954 4 Sheets-Sheet 4

INVENTOR
F. T. ANDREWS, JR.
BY James W. Falk
ATTORNEY

United States Patent Office 2,776,380

Patented Jan. 1, 1957

2,776,380

ELECTRICAL CIRCUITS EMPLOYING MAGNETIC CORES

Frederick T. Andrews, Jr., Morristown, N. J., assignor to Bell Telephone Laboratories, Incorporated, New York, N. Y., a corporation of New York Application April 27, 1954, Serial No. 425,875

14 Claims. (Cl. 307—88)

This invention relates to electrical circuits and more particularly to such circuits employing magnetic cores and utilized as logic circuits.

Various magnetic core logic circuits have been proposed which utilize the substantially square hysteresis loops of the magnetic material of the core. These logic circuits may be utilized to attain desired functions in large informational systems, such as digital computers or telephone switching systems. Prior logic systems employing magnetic core circuits have generally been limited to two types employing but two basic core circuits, an Or circuit, which produces an output in response to one or more inputs, and a Joint Denial circuit, such as disclosed in application Serial No. 363,832, filed June 24, 1953 of R. C. Minnick, which produces an output in the absence of all inputs. By utilizing these two basic circuits any logical function can be synthesized. However, function synthesized in this way may not be economical in the use of equipment.

It is an object of this invention to provide an improved magnetic core logic circuit.

It is another object of this invention to reduce the number of components required in magnetic core logic systems.

It is a further object of this invention to simplify logic systems employing magnetic cores. More specifically, objects of this invention include decreasing the number of logic stages required in such systems and reducing the input power required for such systems.

It is a still further object of this invention to simplify the design of logic systems employing magnetic cores.

These and other objects are attained in specific embodiments of this invention by providing output circuits for the magnetic core logic circuits in series with the activating windings thereof, the output circuits comprising the output load shunted by the output winding network. The output load is shunted by an output winding path for all input conditions except that for which an output is desired. The output winding network may comprise a single output winding on one core or a plurality of output windings on a number of cores, the various windings being connected in parallel and/or in series to attain the desired shunting logic.

Advantageously, a diode is connected in each possible shunt path. If the application of the advance pulse to the cores does not cause a voltage to be induced in an output winding in a particular shunt path, the resistance of that path is merely the forward resistance of the diode itself and the advance pulse current will be shunted through this path and not through the load circuit. However, if a voltage is developed across an output winding in this path the diode will be back biased and this path will be blocked. Accordingly, if all possible shunt paths are blocked, the advance pulse current will flow through the load circuit.

If output windings are connected in series with a single diode in shunt across the load circuit, an Or circuit is attained for the input functions of the cores. By connecting the output windings in parallel, each with its own diode, and in shunt across the load circuit, an And circuit is attained. It is apparent that any possible shunt path in an And circuit configuration may itself be an Or circuit. Similarly, by proper input logic, any core may be a Joint Denial circuit.

In magnetic core logic circuits employing shunt type magnetic cores in accordance with aspects of this invention each core functions logically as a multicontact, multiwinding relay. Using a two phase clock system, in which there are only input and advance pulses, a core is equivalent to a relay with all make contacts. The addition of a third clock phase for reset purposes results in the core equivalent of a relay with all break contacts. In theory any function can be synthesized using at most two cores per input variable. Of course, there is a practical limit on the number of input and output windings that can be placed on a single core, just as there is a limit on the number of contacts on a relay. However, by employing magnetic core circuits in accordance with this invention, the design of logical systems is considerably simplified for the worker in this art as relay circuit design techniques can be used, with due allowance for the possibility of multiple input windings.

It is a feature of this invention that a magnetic core have an input, advance, and output winding thereon, the load being shunted by the output winding so as to receive an output pulse only when the output winding path is blocked.

It is a further feature of this invention that the load of a magnetic core logic circuit may be shunted by an output winding network comprising the output windings of a plurality of magnetic cores.

It is another feature of this invention that the output winding network may comprise a plurality of paths so that the load receives an output only when each of the possible shunt paths is blocked. Further in accordance with this feature of this invention, each of these paths may comprise one or more output windings, the output windings being on various of the magnetic cores.

It is a still further feature of this invention that a diode or other unidirectional current element be connected in series with each of the shunt paths, the diode being back biased by a voltage induced in any of the output windings in that path to block that possible shunt path. Further it is a feature of this invention that a diode or other unidirectional current element be connected in series with the load.

It is still another feature of this invention that the output windings on a given group of cores may be connected into more than one output winding network, each network providing one or more possible shunt paths for a load individual thereto. No one output winding would be present in more than one of these output windings. Further, the loads of these output winding networks may themselves comprise input windings of other magnetic core logic circuits.

It is still a further feature of this invention that each of the activating windings of a given group of cores be connected in series and be in series with each of the output winding networks comprised of the output windings of those cores.

A complete understanding of this invention and of these and various other features thereof may be gained from consideration of the following detailed description and the accompanying drawing, in which.

Figure 4:
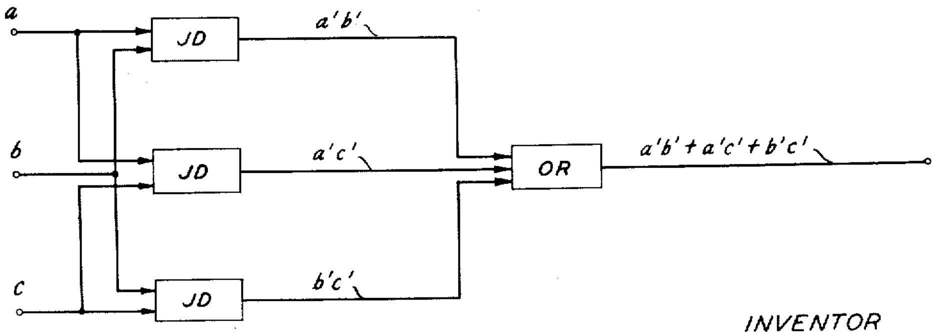
Fig. 4 is a block diagram of the logical units utilized in one circuit to attain the function $f=a'b'+b'c'+a'c'$.
Figure 6:
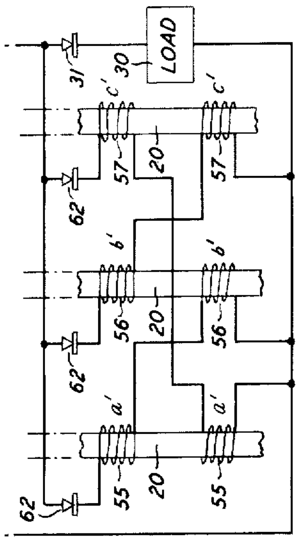
Figure 7:
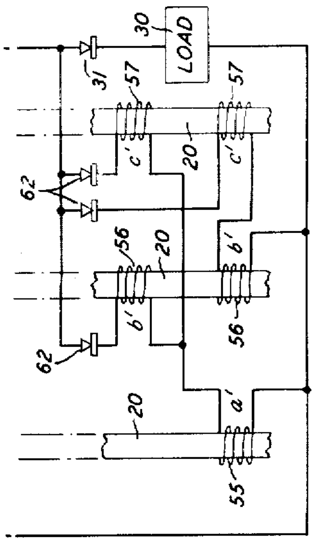
Figure 8:
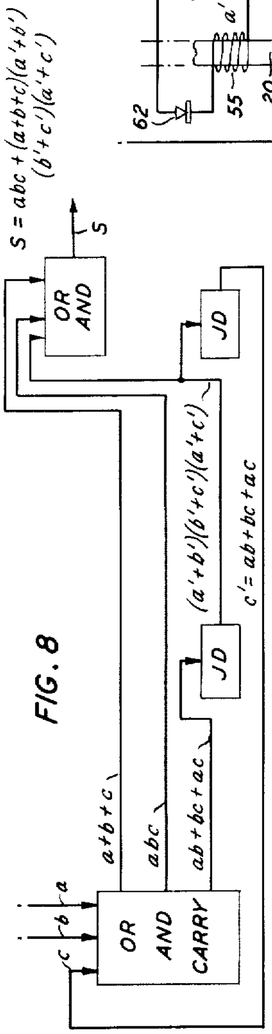
Figure 5:
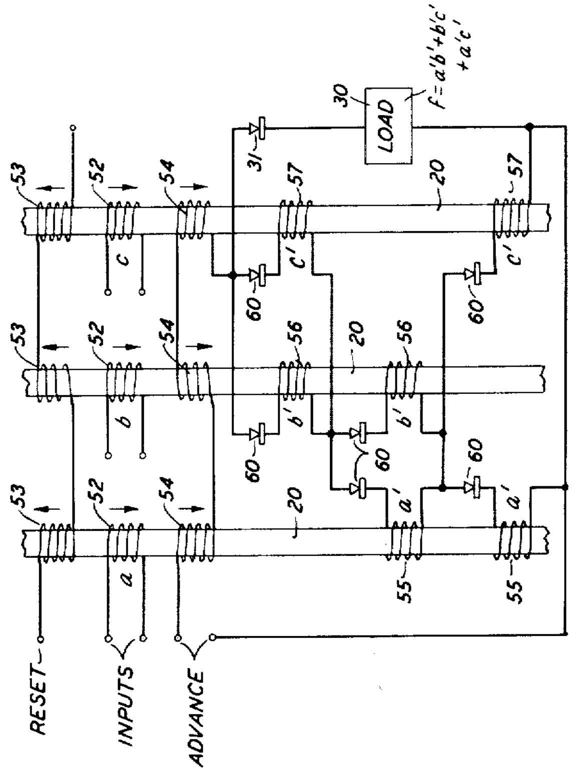

Figs. 5, 6, and 7 are schematic representations of specific embodiments of this invention utilizing shunt type magnetic core logic circuits to attain the function of the circuit of Fig. 4;

Fig. 8 is a block diagram of one type of serial binary adder; and

Figure 9:
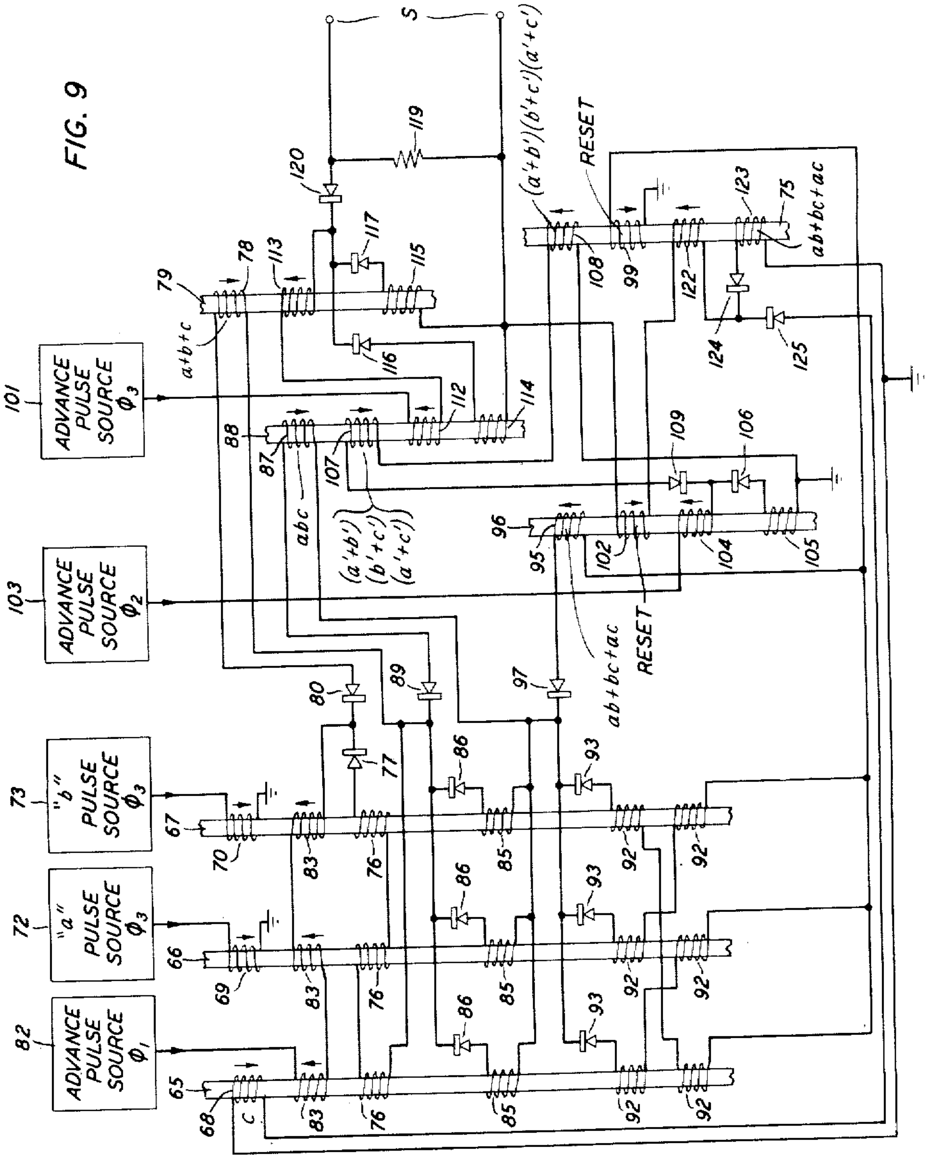
Figure 10:
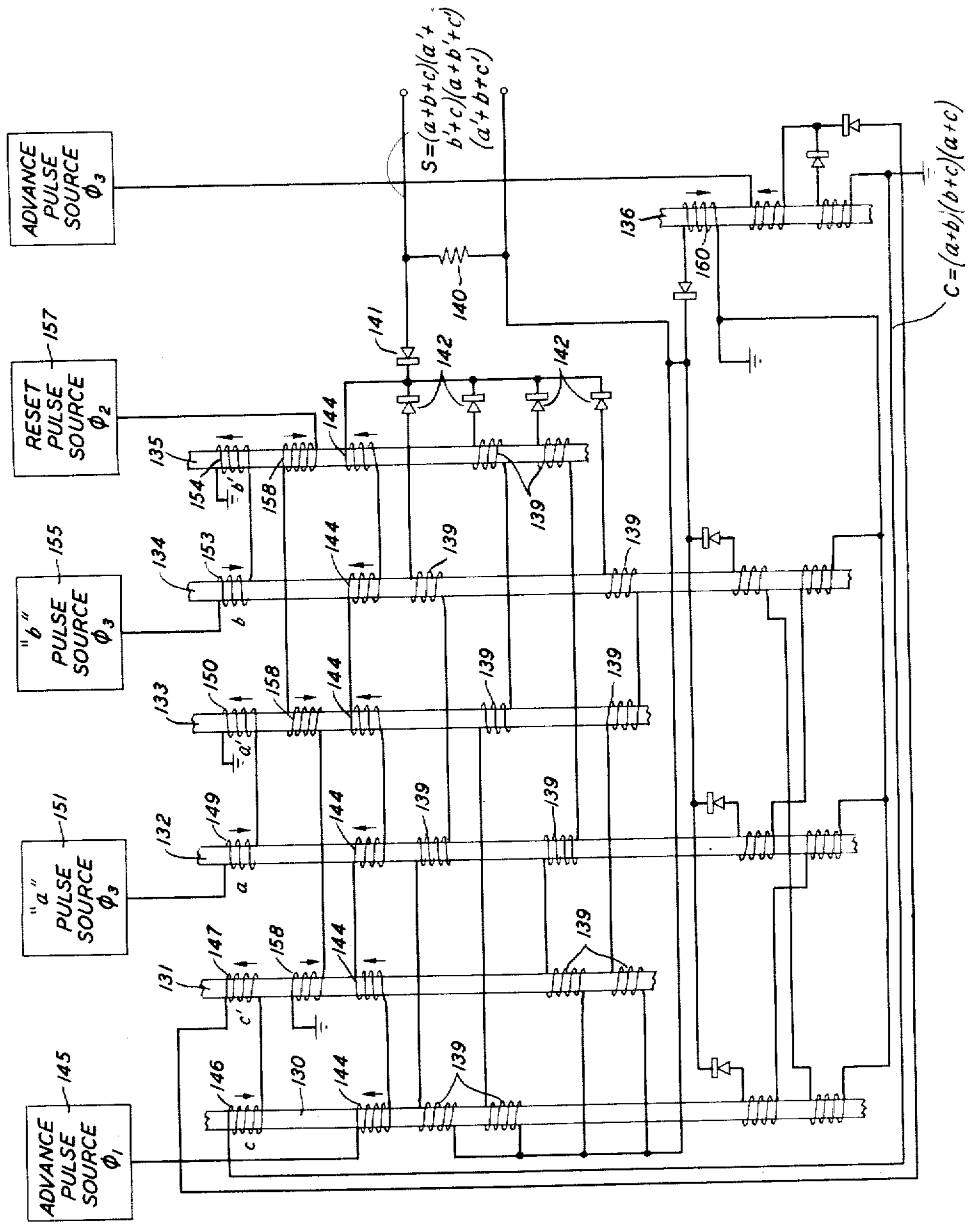

Figs. 9 and 10 are schematic representations of serial binary adders employing shunt type magnetic core logic circuits in accordance with aspects of this invention.

Figures 1, 2:
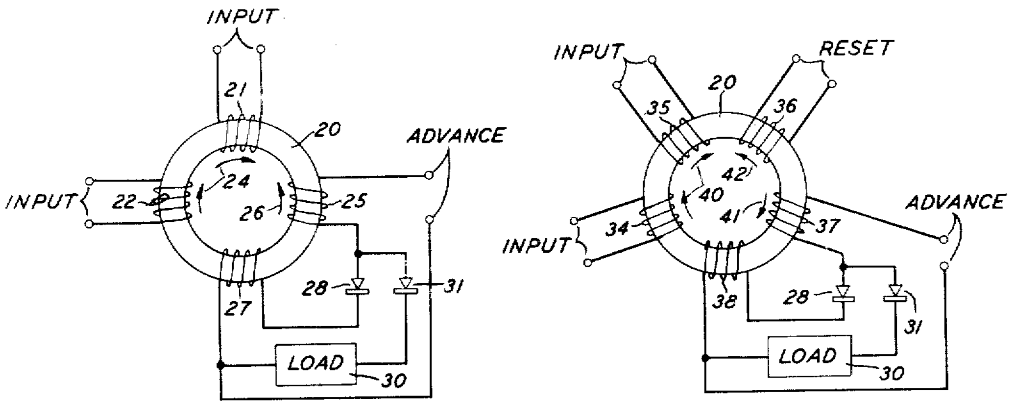
Fig. 1 is a schematic representation of one specific embodiment of a shunt type magnetic core logic circuit in accordance with this invention, comprising an Or circuit.
Fig. 2 is a schematic representation of another specific embodiment comprising a Joint Denial circuit.
Figure 3:
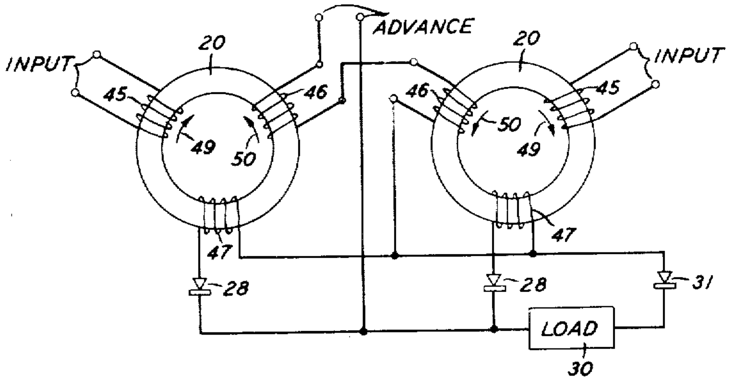
Fig. 3 is a schematic representation of another specific embodiment comprising an And circuit.

Turning now to the drawing, Figs. 1, 2, and 3 are schematic representations of three magnetic core circuits, in accordance with this invention, utilizing cores having square hysteresis loops and which are basic building blocks to perform the functions of logic required in digital computing and telephone switching systems. Fig. 1 is an Or circuit; Fig. 2 a Joint Denial circuit; and Fig. 3 an And circuit. In each circuit the core 20 may be a toroid of metallic tape or ferrite which exhibits a rectangular hysteresis loop.

In the Or circuit depicted in Fig. 1, input pulses applied to the input windings 21 and 22 produce magnetizing forces which leave the core 20 magnetized in a clockwise direction, as indicated by the arrows 24. An advance pulse is applied to the advance winding 25 and tends to leave the core magnetized in a counterclockwise direction, as indicated by the arrow 26. The output winding 27 is connected in series with the activating winding 25 through a diode or other unidirectional current element 28. The load 30 together with another diode or unidirectional element 31 is connected across the output winding 27 and diode 28. The advance pulse current accordingly passes first through the advance winding 25 and then through the output circuit which consists of the output winding 27 and the load 30 in parallel.

The initial condition of the circuit occurs after an advance pulse and therefore with the core magnetized in the direction indicated by the arrow 26. In the absence of any input pulses before the occurrence of the next advance pulse, little voltage is induced in the windings by the advance current since little change in flux takes place. The impedance of the output winding branch of the output circuit is essentially the forward impedance of the diode 28. Since this is much smaller than the impedance of the load, most of the advance current is shunted from the load and no output is produced.

However, if an input pulse is applied to one or more of the input windings 21, 22 between the successive advance pulses, then the change of flux produced by the advance pulse induces a voltage in the output winding 27 which back biases the diode 28 in series with it. The impedance of this branch is then the back resistance of the diode, and most of the advance current flows as an output pulse through the load 30.

The circuit depicted in Fig. 2 is a Joint Denial circuit, of the type disclosed in application Serial No. 363,832, filed June 24, 1953 of R. C. Minnick, having input windings 34, 35, a reset winding 36, advance winding 37, and an output winding 38. In accordance with an aspect of this invention, the output circuit comprises the output winding 38 and load 30, each in series with a diode 28 or 31, respectively, connected in series with the advance winding 37.

A complete cycle of operation of this circuit consists of input, advance, and reset pulses, in that order, as set forth in the above-mentioned Minnick application. The input and advance pulses both magnetize the core in a clockwise direction, as indicated by the arrows 40 and 41, respectively, while the reset pulse magnetizes it in a counterclockwise direction, as indicated by the arrow 42. A pulse on one or more of the input windings will switch the core to a clockwise magnetization before the arrival of the advance pulse. Since the advance pulse causes no further change in flux, the output winding 38 shunts the load 30 during the advance pulse. If no input pulses are applied to the windings 34, 35, the core 20 will remain magnetized in the counterclockwise direction, due to the reset pulse, when the advance pulse is applied. The resultant change in flux through the output winding 38 will accordingly back bias the diode 28 and the advance current will be delivered to the load 30.

The advance and reset pulses may advantageously be supplied from constant current sources which have a high impedance to the flow of current when they are in the off condition and do not load the core during the input interval. Except during the advance pulse, current cannot flow in either direction in the output winding or load because of the presence of the diodes 28 and 31 in the two branches. Therefore, logic circuits of the type depicted in Fig. 2 can be directly cascaded, the load on one core being the input winding on a succeeding core, without interaction between stages.

In Fig. 3 is depicted one illustrative embodiment of a shunt type magnetic core And logic circuit, in accordance with this invention. In this circuit two cores 20 are employed each having an input winding 45, an advance winding 46, and an output winding 47. The advance windings are connected in series and in series with the parallel combination of the two output windings 47, each in series with a diode 28, shunted by the load 30 also in series with the diode 31. Unless inputs are applied to both input windings 45, thereby magnetizing each core 20 in a clockwise direction as indicated by the arrows 49, one of the cores will remain magnetized in the counterclockwise direction, indicated by the arrows 50, and its output impedance will be merely the forward impedance of a diode 28. Accordingly, the load 30 will be shunted by this low impedance path and no advance current will be delivered to the load. Thus the load is shunted unless both cores 20 receive input pulses.

The diodes 28 and 31 are advantageously employed so that the shunt paths are blocked when the input conditions are such that an output is to be delivered to load 30, to prevent current flow in the output circuit during the application of the input pulses or, in the embodiment of Fig. 2, the reset pulses, and also to prevent erroneous information being fed back to these cores from the load 30. This last is particularly of import when the load 30 is itself the input winding of another magnetic core, as described further below.

Certain of the advantages of shunt type magnetic core logic circuits, in accordance with features of this invention, over prior types of logic circuits can be readily seen from consideration of two exemplary types of circuits. Figs. 4, 5, 6, and 7 are various circuits for realizing the function $$f=a'b'+b'c'+a'c' \quad (1)$$

and Figs. 8, 9, and 10 are circuit diagrams of serial binary adders.

Referring now to Fig. 4 there is depicted a block diagram of a circuit consisting only of Or and Joint Denial logic circuits for producing the function of Equation 1. The first stage cores generate the functions $a'b'$, $a'c'$, and $b'c'$, which functions are combined in the second stage core to obtain the desired output. These core logic circuits may be either of the prior types or of the types depicted in Figs. 1 and 2 above. It should be pointed out, however, that shunt type magnetic core logic circuits in accordance with this invention lend themselves readily to modifications of the output circuitry to attain vastly improved circuits not attainable with the prior types of core circuits. Before considering these improved circuits it should be noted that in the circuit of Fig. 4 there are two stages of logic, four logic elements, and each input must have sufficient energy to drive two cores.

Turning now to Fig. 5, the illustrative embodiment there depicted comprises but three magnetic cores 20 each having a single input winding 52, a reset winding 53, and an advance winding 54 thereon. The reset windings 53 are connected in series. Input *a* is applied to the input winding 52 of the first core, input *b* to that of the second core, and input *c* to that of the third core. The advance windings 54 are connected in series and in series with the output circuit, one branch of which consists of the load 30 and the diode 31. Shunted across this branch of the output circuit is the output winding network. This network was derived directly from the desired output expression, Equation 1 above, and comprises a pair of output windings on each core and a diode 60 for each output winding. A voltage is induced across the output windings 55 of the first core on occurrence of $a'$, across the output windings 56 of the second core on occurrence of $b'$, and across the output windings 57 of the third core on occurrence of $c'$, the inputs of each core being Joint Denial circuits.

As discussed above, in magnetic core logic circuits in accordance with this invention, the advance current can only flow through the output load 30 when the shunt path is blocked by generation of a voltage across the output windings of the cores. Equation 1 states that the shunt path should be blocked when inputs *a* and *b* are not present, or inputs *b* and *c* are not present, or inputs *a* and *c* are not present. A perusal of the output winding network of Fig. 5 will establish that by connecting pairs of output windings in parallel and these paralleled combination in series this criterion is followed. Thus if the input function is $a'b'$, voltages will be developed across both windings 55 and 56 and therefore this shunt path will be blocked. However, if the input function is only $a'$ then, while the output windings 55 will back bias their respective diodes 60, a shunt path will still be available through the windings 56 and 57 and accordingly no output pulse will be delivered to the load 30.

The output winding network of Fig. 5 requires six output windings and six diodes 60. This can be further simplified if the network is derived from the expression $$f=(a'+b')(b'+c')(a'+c') \quad (2)$$

which is a modified form of Equation 1; such an output circuit is depicted in Fig. 6. As can be seen an output will only be applied to the load 30 if all three diodes 62 are back biased. This will occur if either of the two output windings in series with the diode 62 has a voltage developed across it on application of the advance pulse. Only three diodes and six output windings are utilized in this output winding network.

One output winding can be eliminated by further reducing the output expression to $$f=(a'+b'c')(b'+c') \quad (3)$$

This circuit is depicted in Fig. 7.

It is apparent from a consideration of Figs. 4, 5, 6, and 7 that core logic circuits utilizing shunt type output circuits, in accordance with features of this invention, to attain a desired output function require fewer components, only one stage or logic, and less input power than required by prior types of magnetic core logic circuits.

Further to illustrate the advantages of shunt type magnetic core logic circuits and their flexibility, Figs. 8, 9, and 10 depict serial binary adders, Fig. 8 being a block diagram of such an adder as may be attained by prior logic circuits, Fig. 9 a schematic representation of an identical circuit employing shunt type magnetic core logic circuits, and Fig. 10 a schematic representation of a simplified circuit employing shunt type magnetic core logic circuits.

Turning now to Fig. 8, the binary adder there depicted has three stages. The first stage produces the functions $a+b+c$, $abc$, and $ab+bc+ac$, the last of these being the desired carry. The second stage produces the negative of the carry, $(a'+b')(b'+c')(a'+c')$. In the last stage one logic unit produces the desired sum by combining $a+b+c$, $abc$, and $a'b'+b'c'+a'c'$ in an Or-And circuit, while the other logic unit of this stage reinverts the carry and returns it to the first stage suitably delayed for the next addition.

A shunt type magnetic core logic circuit in accordance with the block diagram of Fig. 8 is depicted in Fig. 9. The circuit operates on a three phase basis. Phase 1 of the three phase clock advances the first stage and resets the third stage, phase 2 advances the second stage, and phase 3 advances the third stage and resets the second stage. The first stage comprises three cores 65, 66, and 67 having input windings 68, 69, and 70 thereon, respectively. Input pulses from the "*a*" pulse source 72 and the "*b*" pulse source 73 are applied to windings 69 and 70 in the third phase and the carry input *c* is applied to the input winding 68 of core 65 on application of an advance pulse to core 75, described further below, during the third phase. A consideration of the various output circuits on these first stage cores will reveal that they are of the types described above.

Thus each core has a first output winding 76 connected in series with a single diode 77 and shunted across an output load comprising an input winding 78 on core 79, described further below, and a diode 80. This output network is therefore an Or circuit and an output pulse is delivered to the load 78 if any of the inputs *a*, *b*, or *c* is present when an advance pulse is applied in phase 1 from an advance pulse source 82 to the advance windings 83 connected in series on these three cores. The first output circuit on these cores is thus an Or circuit of the type depicted in its simplest form in Fig. 1.

The advance pulse, on passing through this Or output circuit, is then applied to an And output circuit, of the type depicted in Fig. 2, which comprises an output winding 85 on each of the cores 65, 66, 67 having a diode 86 in series with it, the windings being in parallel and being shunted across the output load which comprises an input winding 87 on core 88, described further below, and a diode 89. An input pulse is thus applied to input winding 87 only when all three inputs *a*, *b*, and *c* are present in the first stage.

The third output winding network on the cores 65, 66, and 67 comprises a pair of windings 92 on each core and three diodes 93 and is identical with the output winding network depicted in Fig. 6; it is shunted across an output load comprising the input winding 95 of another core 96, described further below, and a diode 97. The input applied to winding 95 is therefore the function $ab+bc+ac$.

The phase 1 advance pulse is then also applied to the reset winding 99 of core 75.

Core 96 is a Joint Denial circuit of the type depicted in Fig. 2 above. It is reset in phase 3 by the advance pulse applied to cores 79 and 88 from advance pulse source 101 and thence to the reset winding 102; its advance pulse is applied in phase 2 from an advance pulse source 103 to an advance winding 104. The output circuit comprising an output winding 105 and diode 106 in shunt across the load which comprises input windings 107 and 108 on cores 88 and 75, respectively, and a diode 109.

Cores 79 and 88 comprise an And circuit of the type depicted in Fig. 3 above. Core 87 has two inputs, applied to input windings 88 and 107, while core 79 has but a single input applied to input winding 78, as described above. The advance windings 112 and 113 of the two cores, respectively, are connected in series and the output circuit comprises the parallel output windings 114 and 115 of the two cores, respectively, each with its diode 116 and 117, which output windings are in shunt across the load comprising an output impedance 119 and diode 120. The output S is thus taken across impedance 119 on application of the phase 3 advance pulse from source 101 to the advance windings 112 and 113.

The advance pulse from source 101 is also applied to the advance winding 122 of the Joint Denial circuit of core 75. The output circuit of this core comprises the output winding 123 which together with diode 124 is in shunt across the load circuit which comprises the diode 125 and the input winding 68 of core 65.

The specific embodiment of a binary adder depicted in Fig. 9 requires a total of seventeen diodes, which is nearly as many as required to build an adder with ordinary diode circuits. However, a diode adder must use several vacuum tubes or transistors to overcome the loss in the diode logic and also an external element for storing the carry between successive additions. Furthermore, the timing and duration of the various pulses are critical, particularly when one pulse must inhibit another. The gain, memory, and reliability properties of shunt type magnetic core circuits give them a distinct advantage in spite of the number of diodes required.

However, the particular embodiment of Fig. 9 does not employ shunt type magnetic core logic circuits to their full advantage with regard to circuit economy of elements. The embodiment of Fig. 9 enables one readily to see how the various logical steps, set forth in the block diagram of Fig. 8, can be attained. However, by rearranging the various shunt output circuits the number of circuit elements can be reduced. One such circuit for a serial binary adder is depicted in Fig. 10 wherein seven magnetic cores 130, 131, 132, 133, 134, 135, and 136 are employed. Core 136 is the carry storage core. The other cores are arranged in pairs whose setting inputs are *c,c'*, *a,a'*, and *b,b'*. Each core is provided with two output windings 139 utilized in the first output circuit to provide the shunt paths for the output load comprising the output impedance 140, across which the sum function S appears, and the diode 141. The output windings 139 are connected as an And circuit network having four conditions and therefore four possible shunt paths each including a diode 142.

An advance pulse is applied to this first output circuit through the series connected advance windings 144 from a phase 1 advance pulse source 145. Input pulses *c* and *c'* are applied to input windings 146 and 147 which represent the load of the output circuit of the carry storage core 136. Inputs *a* and *a'* are applied to windings 149 and 150 from a phase 3 "a" pulse source 151; similarly inputs *b* and *b'* are applied to input windings 153 and 154 from a phase 3 "b" pulse source 155, cores 131, 133, and 135, are reset by a pulse from a phase 2 reset pulse source 157 applied to the reset windings 158.

Cores 130, 132, and 134 have a second output circuit to apply the carry function to the input winding 160 of core 136. This output circuit is also identical with that of Fig. 6 and has been fully described above.

In the specific embodiment of a serial binary adder depicted in Fig. 10, both the carry and sum are obtained in a single stage of logic using six cores with an additional core acting simply as a carry delay. Though seven cores are still required, the number of diodes has been reduced to eleven. Three output windings can be eliminated by circuit simplification, but this obscures the symmetry of the circuit.

The cores employed in the circuits described above may advantageously be of 4–79 molybdenum-Permalloy tape wound and annealed on a ceramic bobbin, though other magnetic materials having substantially square hysteresis loops may be employed, as is known in the art. One specific molybdenum-Permalloy tape that may be employed has the following specifications:

| | | |
|---|---|---|
| Tape thickness | inch | .00025 |
| Tape width | do | .125 |
| Number of wraps | | 20 |
| Diameter of bobbin | inch | .187 |

The effective resistance is .90 ohm per turn squared and 0.17 ampere turn is required to just operate the core. It is advisable that the driving current be sufficient to give about twice this just operate value of ampere turns to assure reliable and uniform operation.

The diodes may be of any of the large number of types known in the art; in one specific embodiment of this invention Hughes HD–2014 diodes were employed, these diodes having a forward resistance of about 10 ohms in the range of current used.

When the cores and diodes described above are employed in a logic arrangement requiring one logic network to drive one core in a subsequent stage, the number of turns in the windings may advantageously be as follows:

| | |
|---|---|
| Input | 15 |
| Advance | 10 |
| Output | 30 |
| Reset | [1] 10 |

[1] If required.

A current pulse of 35–100 milliamperes would be suitable, resulting in a switching time of from 3.3 to .75 microseconds.

From the above description and the illustrative embodiments depicted it is apparent that shunt type magnetic core logic circuits have numerous advantages over prior types of logic circuits, being more economical of elements, having a high degree of circuit flexibility, requiring no special gating or pulsing schemes to prevent undesired interaction between stages or the generation of false outputs, as in some other types of magnetic core logic circuits, requiring no elements to make up inherent losses, as in ordinary diode logic circuits, and not depending on maintaining the amplitude, duration, or occurrence of the various pulses within critical limits. Further, as pointed out above, shunt type magnetic core logic circuits can be considered as a multicontact relay with all break or all make contacts and therefore the logical design of circuits employing shunt type magnetic core logic circuits can be accomplished readily by one skilled in the art using existing relay circuit techniques.

Reference is made to Patent 2,719,773, issued October 4, 1955, of M. Karnaugh wherein a related invention is disclosed and claimed.

It is to be understood that the above-described arrangements are illustrative of the application of the principles of the invention. Numerous other arrangements may be devised by those skilled in the art without departing from the spirit and scope of the invention.

What is claimed is:

1. An electrical circuit comprising a magnetic core having a plurality of windings thereon, said windings including an input winding, an output winding, and an advance winding, first unidirectional current means connected in series with said output winding, load means, second unidirectional current means connected in series with said load means, said load means and second unidirectional means being connected in parallel across said output winding and said first unidirectional current means, and means connecting said advance winding to said paralleled output winding and load means.

2. An electrical circuit in accordance with claim 1 wherein another of said windings is a reset winding.

3. An electrical circuit comprising a plurality of magnetic cores each having a plurality of windings thereon, said windings including an input winding, an output winding, and an advance winding, means connecting said advance windings in series, means connecting said output windings to define a plurality of parallel paths, means connecting said parallel paths to said series connected advance windings, load means connected so as to be shunted by said parallel paths, and means for preventing flow of current to said load means due to flow of current in any of said windings except said advance windings whereby an output is delivered to said load means on flow of current through said advance windings only when each of said parallel paths is blocked.

4. An electrical circuit comprising a plurality of magnetic cores each having a plurality of windings thereon, said windings including an input winding, an output winding, and an advance winding, means connecting said advance windings in series, means connecting said output windings in parallel paths, means connecting said parallel paths to said series connected advance windings, a unidirectional current element in each of said paths, load means, and a unidirectional current element in series with said load means, said load means and said last-mentioned unidirectional element being connected so as to be shunted by said parallel paths whereby an output is delivered to said load means only when each of said parallel paths is blocked.

5. An electrical circuit in accordance with claim 4 wherein certain of said parallel paths comprise at least two output windings in series, said two output windings being on different ones of said cores.

6. An electrical circuit comprising a plurality of magnetic cores each having a plurality of windings thereon, said windings including an input winding, an output winding, and an advance winding, means connecting said advance windings in series, means connecting said output windings to define a plurality of parallel paths, load means, at least a first unidirectional current element in series with said output windings, and a second unidirectional current element in series with said load means, said load means and second unidirectional element being shunted by said output windings and said first unidirectional current element and in series with said advance windings whereby an output is delivered to said load means only when a voltage is induced in one of said output windings to back bias said first unidirectional current element.

7. An electrical circuit in accordance with claim 6 wherein at least certain of said parallel paths include a plurality of series connected output windings.

8. An electrical circuit in accordance with claim 7 wherein one of said first unidirectional current elements is connected in series with said output windings in each of said parallel paths.

9. An electrical circuit comprising a plurality of magnetic cores each having a plurality of windings thereon, said windings including an input winding, a number of output windings, and an advance winding, a plurality of load means, a first unidirectional current element in series with each of said load means, an output winding network shunted across each of said load means and first unidirectional current elements, each of said networks comprising at least one shunt path comprising output windings of certain of said cores and a second unidirectional current element in series in said path, and means connecting said advance windings in series and to each of said output winding networks in series.

10. An electrical circuit in accordance with claim 9 wherein each of said load means comprises the input winding of another magnetic core.

11. An electrical circuit comprising a plurality of magnetic cores each having a plurality of windings thereon, said windings including an input winding, output windings, and an advance winding, a plurality of load means, an output winding network shunted across each of said load means, each of said networks comprising at least one shunt path comprising output windings of certain of said cores whereby an output is delivered to one of said load means only when each path of the network shunted thereacross is blocked, means connecting said advance windings in series and to each of said output winding networks in series, and means for preventing flow of current to any of said load means due to flow of current in any of said windings other than said advance windings.

12. An electrical circuit comprising a plurality of magnetic cores each having a plurality of windings thereon, said windings including input, output, and advance windings, load means, an output winding network shunted across said load means and including at least one shunt path comprising output windings of certain of said cores and unidirectional current means whereby an output is delivered to said load means only when each possible path of the network shunted thereacross is blocked, and means for switching the direction of magnetization of said cores and applying a pulse to said output winding network.

13. An electrical circuit comprising a plurality of magnetic cores each having a plurality of windings thereon, said windings including an input winding, an output winding, and an advance winding, means connecting said output windings in parallel paths, a unidirectional current element in each of said paths, load means, and a unidirectional current element in series with said load means, said load means and said last-mentioned unidirectional element being connected so as to be shunted by said parallel paths whereby an output pulse is delivered to said load means on a switching of the direction of magnetization of said cores only when each of said parallel paths is blocked.

14. An electrical circuit comprising a magnetic core having a plurality of windings thereon, said windings including an input, an output, and an advance winding, a first unidirectional current element connected in series with said output winding, load means, a second unidirectional current element connected in series with said load means, said load means and said second unidirectional current element being connected in shunt across said output winding and said first unidirectional current element, and means for switching the direction of magnetization of said core and applying a pulse to said output winding.

References Cited in the file of this patent

UNITED STATES PATENTS

| | | |
|---|---|---|
| 2,640,164 | Giel et al. | May 26, 1953 |
| 2,666,151 | Rajehman et al. | Jan. 12, 1954 |

Notice of Adverse Decision in Interference

In Interference No. 89,692 involving Patent No. 2,776,380, F. T. Andrews, Jr., Electrical circuits employing magnetic cores, final judgment adverse to the patentee was rendered July 2, 1962, as to claims 1 and 14.

[*Official Gazette August 7, 1962.*]